Apr. 10, 1923. 1,451,616
J. IMPELLIZIERI
POWER TRANSMISSION MECHANISM
Filed Aug. 1, 1922 3 sheets-sheet 3

WITNESSES
INVENTOR
Joseph Impellizieri
BY
ATTORNEYS

Patented Apr. 10, 1923.

1,451,616

UNITED STATES PATENT OFFICE.

JOSEPH IMPELLIZIERI, OF BROOKLYN, NEW YORK.

POWER-TRANSMISSION MECHANISM.

Application filed August 1, 1922. Serial No. 578,929.

*To all whom it may concern:*

Be it known that I, JOSEPH IMPELLIZIERI, a subject of the King of Italy, and a resident of the city of New York, borough of Brooklyn, in the county of Kings and State of New York, have invented new and useful Improvements in Power-Transmission Mechanisms, of which the following is a full, clear, and exact description.

This invention relates to power transmission devices and was primarily designed for use in conjunction with sewing machines.

In shops a great deal of difficulty is often experienced when it becomes necessary to transmit power from a main driving shaft to a number of different machines of either the same type or different types. The difficulty arises from the number of auxiliary shafts and power transmission means that have to be provided in order to transmit the power. The installation and alinement of these shafts necessitates a great amount of labor and each time a machine is removed for repairs or for replacement considerable care has to be taken in mounting the machine.

The general object of this invention is the provision of a simple and durable power transmission device that may be mounted in conjunction with any machine and adjusted to transmit power along different lines.

A further object of the invention is the provision of a power transmission device, the gears and clutch wheels of which are so mounted that they are held against movement lengthwise of their shafts.

These objects are accomplished by providing a supporting plate on which a frame is so mounted that it may be rotated in a plane parallel to the supporting plate so as to receive and transmit power along different lines.

These and other objects of the invention will be more clearly understood from the following detailed description and accompanying drawings.

Figure 1:
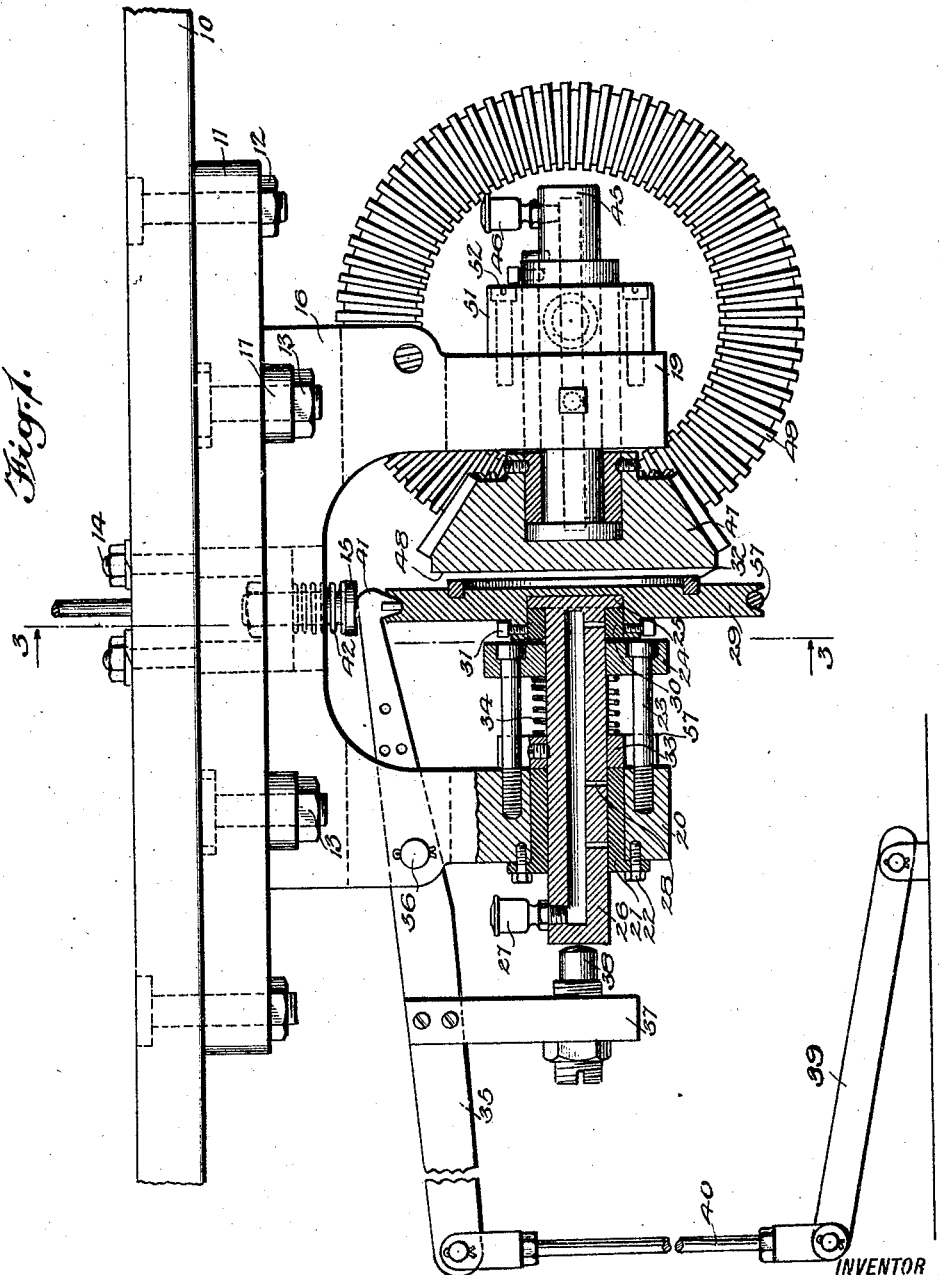
Figure 1 is a side elevation of a power transmission device with a part in section, showing its construction.

Referring to the above-mentioned drawings, a plate 10 is shown with the supporting plate 11 attached thereto by means of bolts 12. Mounted on the supporting plate 11 is a frame 16 provided with four lugs 17. This frame is attached to the supporting plate by means of bolts 13 which are slidably mounted in arc-shaped slots 18 cut in the supporting plate 11. The frame 16 is provided with two arms 19 and 20 which extend parallel to one another.

The arm 20 has an opening extending therethrough in which a bushing 21 is mounted. This bushing 21 is attached to the arm 20 by means of set screws 22. Attached to the arm 20 by means of bolts 23 is an annular plate 24, the internal diameter of which is equal to the internal diameter of the bushing 21. This annular plate is located between the arms 19 and 20. A hollow axle 26 provided with a grease cup 27 which communicates with the axle chamber is slidably mounted in the bushing 21 and the annular plate 24. This axle is held against rotation by the projection 57 formed integral with the axle and adapted for engagement with the bolts 23. Perforations 28 are provided in the hollow axle 26 for lubricating purposes. Formed on one end of the axle 26 is a head 25, the diameter of which is equal to the internal diameter of the hub of a pulley 29. This pulley 29 is mounted on the head 25, and a bushing 30 mounted on the axle 26 is fitted into the hub of the pulley and attached thereto by set screws 31 to retain the pulley in position on the axle. A friction ring 32 is mounted on the face of the pulley 29. A collar 33 is attached to the axle 26 and serves to limit the movement of the axle in one direction. A coil spring 34 is mounted on the axle 26 and interposed between the annular plate 24 and the collar 33 to normally retain the friction ring mounted on the pulley 29 out of engagement with the driven gear to be described in a subsequent paragraph.

A lever 35, which is pivoted to the arm 20 at 36 has a depending arm 37 in which an adjustable pin 38 is mounted. The lever 35 is operated by means of a treadle 39 and a connecting rod 40. By operating the lever arm the pin 38 is forced into engagement with the axle 26, forcing it endwise, carrying the friction ring 32 into engagement with a gear to be described in a subsequent paragraph. Integral with the lever 35 is a brake 41 which engages with the pulley 29 to stop its rotary motion. A plunger 15 is supported in alinement with the brake 41 by means of a U-shaped member 14 carried by the plate 10 and extending through an opening 43 in the supporting plate 11 and into an opening 44 in the frame 16. A spring 42 is mounted on the plunger 15 and serves to force it downward into engagement with the brake 41.

Carried by the arm 19 is a hollow axle 45 provided with a grease cup 46 which communicates with the axle chamber. This axle 45 is mounted in alinement with the axle 26 and has mounted on one end a bevel gear 47 provided with a friction face 48. This gear is mounted in a manner similar to that described for the pulley 29. A bevel gear 49 carried by a transmission shaft 50 which is associated with the main drive shaft meshes with the gear 47. The end of the transmission shaft 50 is supported by a cap 51 in which a bearing for the end of the shaft 50 is provided. This cap 51 is attached to the arm 19 by means of the set screws 52. By removing the set screws the cap 51 may be rotated about the axle 45 in a plane at right angles to the axle thus allowing the shaft 50 to be rotated so as to transmit power along different lines.

When it is necessary to rotate the frame 16 through an angle of 180° from the position shown in Figure 1, a bell crank 53 is pinned to the arm 19 at 54, and the pin 38 is then mounted in the depending arm of the bell crank. The lever 35 carrying the brake 41 has an extension 56 attached to it. A pin 38 is mounted in the extension for engaging the bell crank 53 to operate it when the lever 35 is operated.

Figure 2:
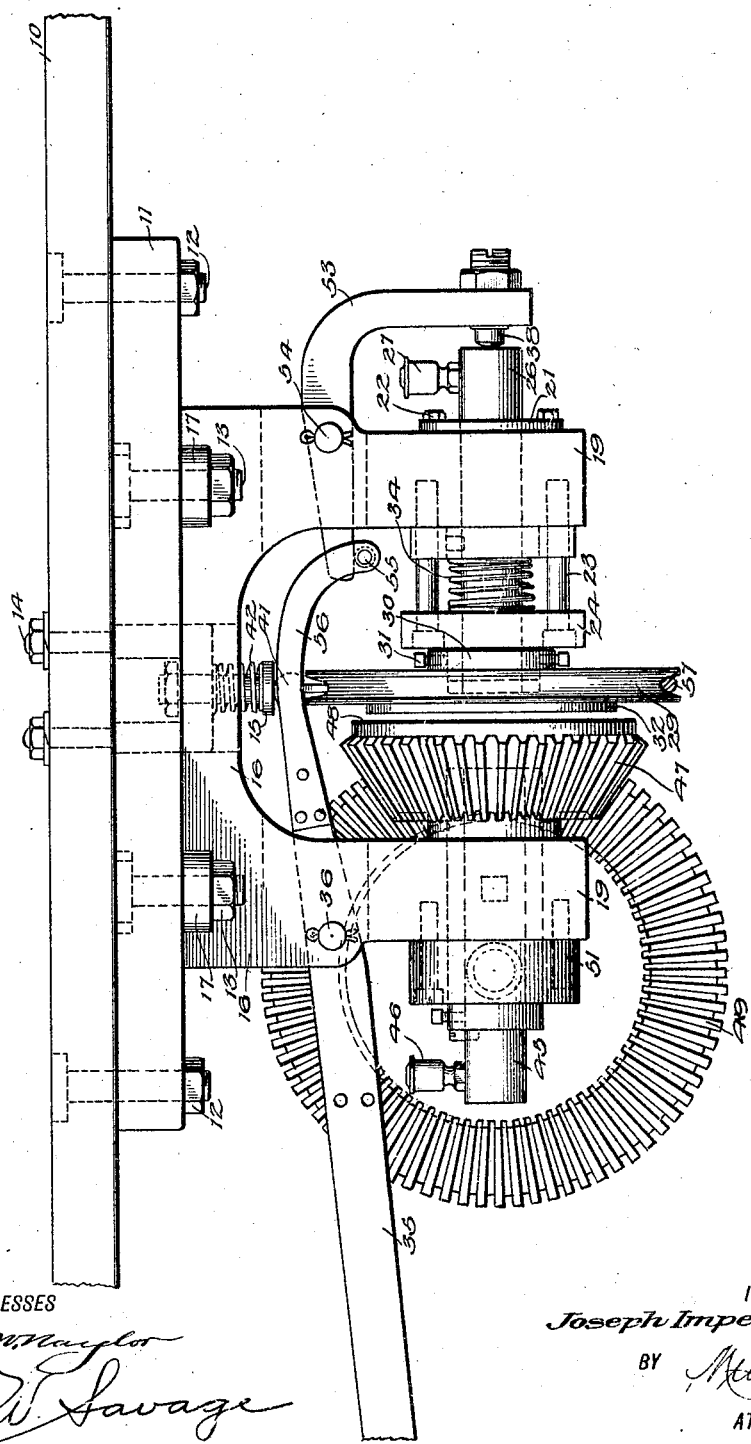
Figure 2 is a side elevation of a modification of the power transmission device.
Figure 3:
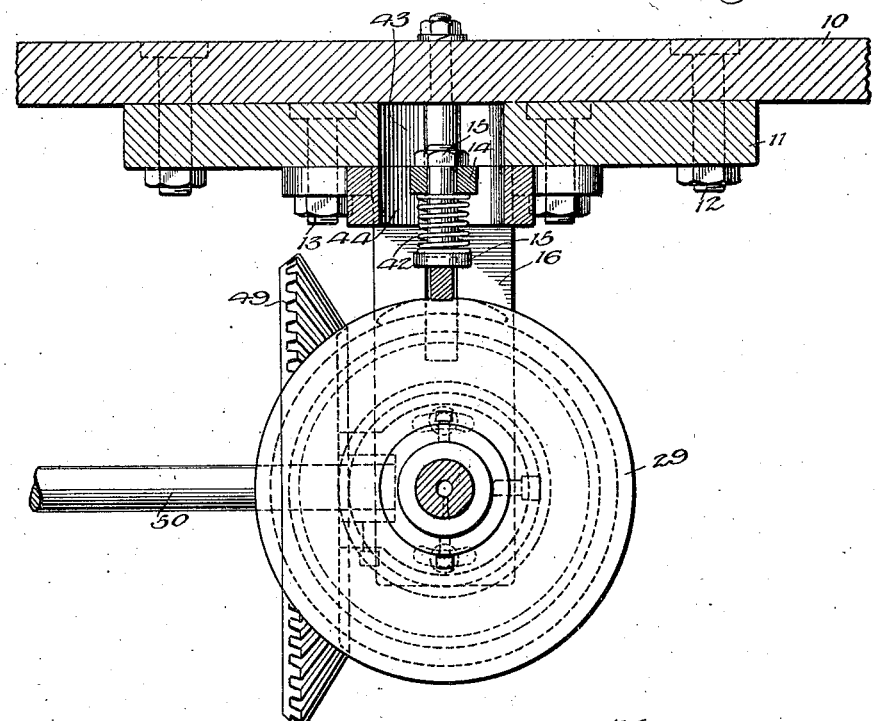
Figure 3 is a section along the line 3—3, Figure 1.
Figure 4:
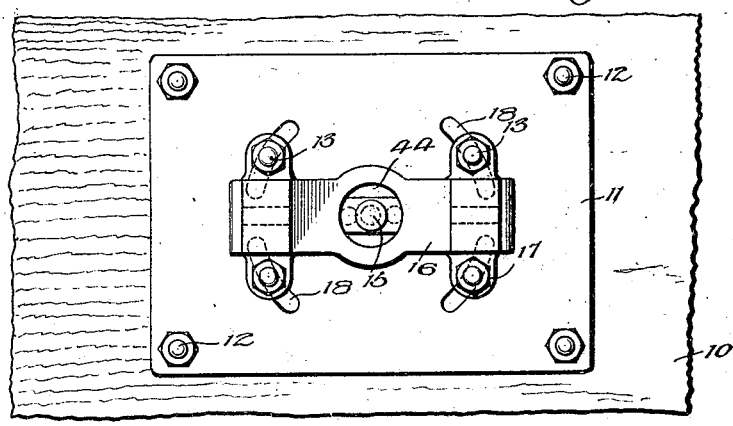
Figure 4 is a plan view of the supporting plate showing the frame adjustably mounted thereon.

The operation of this device is as follows:

After the power transmission mechanism has been attached to the plate 10, the frame 16 may be rotated through smaller angles by sliding the bolts 13 along the arc-shaped slots 18. When it is desired to turn the frame through an angle of 180° the frame 16 is released from the supporting plate 11, turned through the angle and then attached in position, as shown in Figure 2. When it is desired to receive power from the shaft 50 extending at an angle to the horizontal the cap 51 is rotated until the bearing carried by it is in alinement with the shaft 50 so as to receive the same. The gears 49 and 47 are operated through the shaft 50. When it is desired to transmit power from the shaft 50 through the device arranged as shown in Figure 1, the treadle 39 is operated, removing the brake 41 from the pulley 29 and forcing the pin 38 into engagement with the axle 26, forcing it endwise in the bushing 21 and the annular plate 24. This brings the friction ring 32 into engagement with the friction face 48 of the gear 47, and the pulley 29 which carries the belt 58 is operated. When the treadle 39 is released, the spring 34 forces the axle 26 to the left, raising the lever 35. The plunger 15 now acts, forcing the brake 41 into engagement with the pulley 29, serving to stop its motion.

When the device is arranged as shown in Figure 2, the axle 26 is operated through the bell crank 53.

I would state in conclusion that while the illustrated examples constitute practical embodiments of my invention I do not limit myself strictly to the exact details herein illustrated since manifestly the same can be considerably varied without departing from the spirit of the invention as defined in the appended claims.

Claims:

1. A power transmission mechanism of the class described, comprising a frame, an axle slidably mounted in the frame, means for holding the axle against rotation, a clutch pulley rotatably mounted on the end of the axle, means provided in conjunction with the axle and frame for normally holding the clutch pulley in an inactive position, and means mounted on the frame for moving the axle endwise to force the clutch pulley into an active position.

2. In a power transmission mechanism of the character described, a frame, an axle slidably mounted in the frame, means for limiting the endwise movement of the axle, means for holding the axle against rotation, a clutch pulley rotatably mounted on the end of the axle, means for normally retaining the clutch pulley in an inactive position, and means carried by the frame for forcing the axle endwise to throw the clutch pulley into an active position.

3. In a power transmission mechanism including a frame, a device of the character described comprising an axle slidably mounted in the frame, guides fixed to the frame and extending parallel to the axle, a support for the axle fixed to the guides, a clutch pulley rotatably mounted on the end of the axle, means mounted on the axle engaging the guides to hold the axle against rotation and to limit its endwise movement, means interposed between said means and the support carried by the guides for normally retaining the clutch pulley in an active position, and means mounted on the frame for projecting the axle endwise to throw the clutch pulley into an active position.

4. In a power transmission mechanism of the character described including a frame, a hollow axle slidably mounted in said frame, a clutch pulley rotatably mounted on the end of said hollow axle, said axle having a plurality of openings extending through its wall, and means provided in conjunction with the hollow axle for forcing lubricant into the same and through said openings.

5. In a power transmission mechanism including a frame, a device of the character described carried by said frame, comprising an axle slidably mounted in the frame, a clutch pulley rotatably mounted on the end of the axle, guides fixed to the frame and extending parallel to the axle, an axle support mounted on the ends of said guides, a collar fixed to the axle for limiting its endwise movement, means carried by said collar for engaging the guides to hold the axle against rotation, and a spring interposed between the axle support and the collar for normally retaining the shaft projected to the limit of its endwise movement to retain the clutch pulley in an inactive position.

6. In a power transmission mechanism including a frame, a slidable axle and a clutch pulley rotatably mounted on the end of said axle, a device of the character described, comprising means for forcing the axle endwise to throw the clutch pulley into an active position, means carried by said axle operating means for normally engaging the clutch pulley to hold it against rotation and adapted to release the clutch pulley when the axle is moved endwise to throw the clutch pulley into an inactive position.

7. In a power transmission mechanism including a frame, a shaft slidably mounted in said frame, and a clutch pulley slidably mounted on the end of said shaft, a device of the character described for operating the clutch pulley comprising a rocker arm pivotally mounted on said frame, means for operating said rocker arm attached to it, a depending member for engaging the axle to project it endwise to throw the clutch pulley into an active position fixed to said rocker arm, and means provided in conjunction with the rocker arm, and operated by it for engaging the clutch pulley when in an inactive position to hold it against rotation and for releasing the clutch pulley when the axle is projected endwise, throwing the clutch pulley into an active position.

8. In a power transmission mechanism including a frame, a clutch pulley mounting comprising a shaft slidably mounted in the frame, a clutch pulley rotatably mounted on the end of the shaft, guides fixed to the frame and extending parallel to the axle, an axle support mounted on the ends of the guides, a collar fixed to the axle and carrying means for engaging the guides to hold the axle against rotation, a spring interposed between the axle support and collar for projecting the axle endwise to draw the clutch pulley into an inactive position, and a lubricating system provided for lubricating the axle.

JOSEPH IMPELLIZIERI.